June 1, 1926.

A. G. GEISTERT

TIRE CARRIER

Filed Sept. 18, 1922

1,587,225

Inventor
Albert G. Geistert
By his Attorneys
Blackmore, Kewer & Flint.

Patented June 1, 1926.

1,587,225

UNITED STATES PATENT OFFICE.

ALBERT G. GEISTERT, OF DETROIT, MICHIGAN, ASSIGNOR TO GENERAL MOTORS CORPORATION, OF DETROIT, MICHIGAN, A CORPORATION OF DELAWARE.

TIRE CARRIER.

Application filed September 18, 1922. Serial No. 588,888.

This invention relates to tire carriers and more particularly to means for supporting and carrying rims or rims and tires for automobiles employing demountable rims.

One of the objects of my invention is the provision of new and improved means for supporting a rim and tire at the rear of an automobile in such a position as to provide sufficient space at the rear of the tonneau for carrying luggage such as a suit case or other receptacle.

Another object of the invention is the provision of means that is adapted to cooperate with the permanent or attached lugs on the rims for supporting the rim and tire.

Other objects of the invention are the provision of a tire carrier that is especially simple in construction, strong and durable, cheap to manufacture, effective in operation, and one that occupies but a limited space, and that is easily and readily attached to the automobile.

Figure 1:
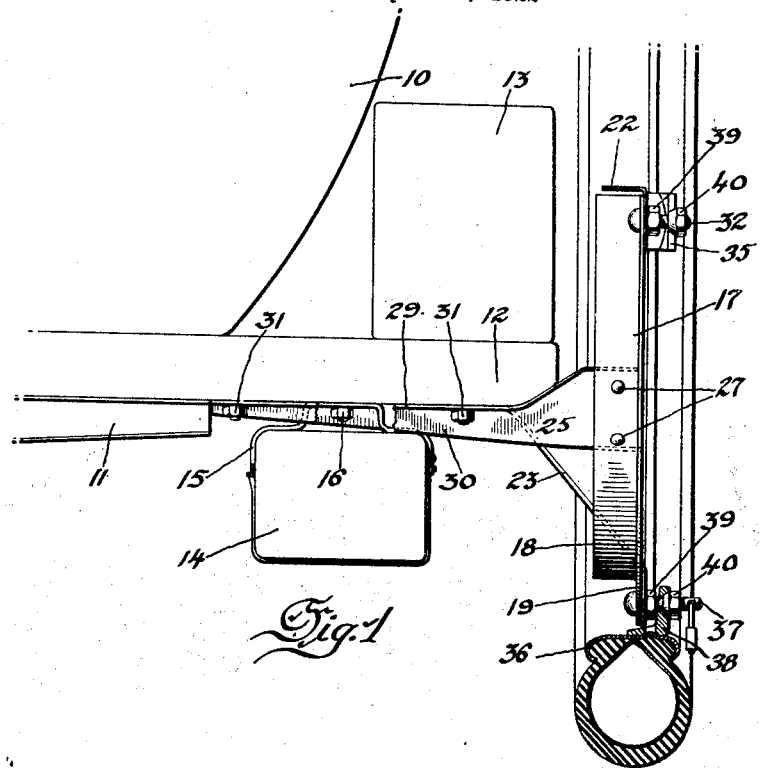
Figure 2:
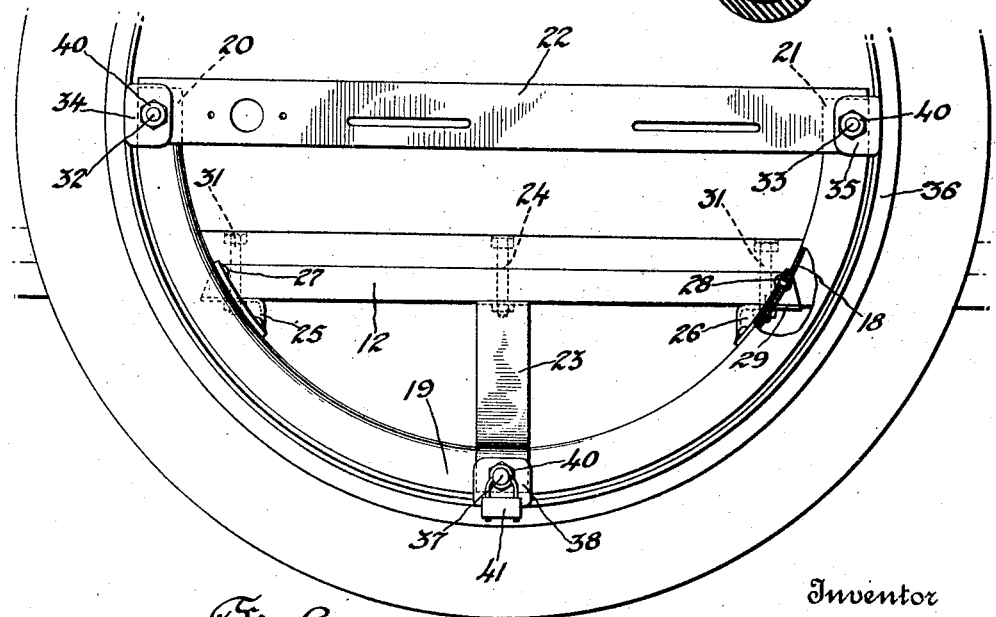

Other and further objects and advantages of the invention will appear from the following description taken in connection with the accompanying drawings in which Figure 1 is a side elevation of a portion of the rear of an automobile with the improved carrier in position thereon, with parts in section and parts broken away; and Fig. 2 is a rear elevation thereof with parts in section and parts broken away.

In the past few years the public has come to use the automobile more and more for touring purposes and consequently it becomes necessary for the car manufacturer to make provision for carrying luggage or baggage for the convenience of the owners of the cars on their touring expeditions. Little or no attempt has heretofore been made to make provision for this purpose on the cheaper or smaller types of cars, due to the difficulty in designing a satisfactory form of tire carrier that is sufficiently compact as not to interfere with such a provision. In the accompanying drawing is shown a carrier that may be employed on the larger as well as the smaller types of cars and that when applied is very efficient for the purposes intended.

On the drawing the reference character 10 designates the rear portion of the body or tonneau and 11 the chassis frame of an automobile of the usual or well known construction. A platform 12 extends rearwardly from the body or tonneau 10 and is adapted to support luggage such as the suitcase or trunk 13 which may be secured to the platform in any suitable manner. The platform 12 may be of wood or any other proper material. The fuel tank 14 may be supported from the platform 12 in any suitable manner as by means of the brackets 15 which may be secured to the platform 12 by fastening means such as the bolts 16.

The platform 12 is also adapted to support a tire carrier 17. The carrier 17 is supported in such a position that it will not interfere with the removal of the luggage 13 from the platform 12. In order to accomplish this it is necessary that the supports for the carrier be supported entirely from the platform, and all brace members between the carrier and the body or tonneau 10 be dispensed with. For this purpose, I have devised a novel form of carrier which will now be described.

The carrier preferably comprises a band or tire support 18 which may be of any suitable form as in the form of a semi-circle as shown on the drawing although it is understood that it may be made in any convenient form. The band 18 is provided with a reinforcing flange 19 on its rear edge which is adapted to extend outwardly from the band in a vertical plane. The band 18 is arranged with its curved portion downwardly and its ends 20 and 21 are preferably connected by means of a brace or cross member 22 which is secured to the flange 19 for reinforcing the same and which is adapted to support the tail lamp and the license tags in the usual manner.

Supporting members are provided for supporting the carrier from the platform 12. Any suitable number of supporting members may be employed. As shown on the drawing three supports are employed, one being attached at each side and one at the bottom of the band or tire support 18. The lower support or supporting member 23 is attached to the lower portion of the band or tire support 18 as by welding the same to the flange 19 as clearly shown in Fig. 1. The member 23 being attached to the flange 19 not only assists in supporting the tire carrier but also reenforces the flange 19 to which the tire carrying studs are attached, as will presently appear. The front end of the supporting member 23 is connected to the lower side of the platform 12 by fastening means such as he bolts 24. The two side supports or supporting members 25 and 26 are secured, one at each side of the band or support 18, at points between the lower portion of said band and the ends thereof by any suitable fastening means such as the rivets 27 and 28. These supports are secured to the tire support 17 in any suitable manner as by being connected to the band 18 by the fastening means 27 and 28. The front ends of the supports 25 and 26 are bent in such a manner as to form attaching flanges 29 and vertical strengthening flanges 30. The flanges 29 are secured to the lower side of the platform 12 as by means of the bolts 31.

It will be noted that the forward or attaching portions of the supports 23, 25 and 26 are all in the same horizontal plane. This is an important feature of the invention because it permits the elimination of all braces or supports above the platform 12 which might otherwise interfere with the carrying of luggage or other articles on said platform. It will also be noted that the rear ends of the braces or supports 25 and 26 are attached to the carrier below the plane of the upper surface of the platform whereby they will not interfere with luggage placed on said platform.

The carrier 17 is provided with suitable studs which are adapted to engage fixed lugs on the rim for supporting and carrying the same. The number of studs will, of course, depend on the number and position of the lugs on the rim. Where the rim is provided with four lugs as shown on the drawing, the band 18 may have each end portion thereof provided with studs 32 and 33 for engaging the lugs 34 and 35 at each side of the rim 36. A third stud 37 may be provided at the bottom of the carrier for engaging the lug 38 on said rim.

The studs 32, 33 and 37 may be supported or attached to the carrier 17 in any suitable manner. As shown, the flange 19 is provided with openings in which said studs, which may be in the form of threaded bolts, are secured. The studs are held in position by means of set nuts 39. Where the rim is provided with attaching lugs located in diametrical planes at right angles to each other, as shown on the drawings, the studs 32 and 33 engage and are secured to the ends of both the brace or cross member 22 and the ends of the band 18 whereby they constitute a rigid support for the tire carrier. The stud 37 is likewise held rigidly in position by engaging both the flange 19 and the outer end of the brace 23.

When it is desired to attach a rim to the carrier, the rim lugs 34, 35 and 38 are placed on the studs 32, 33 and 37 and are held in position thereon by suitable fastening means such as the nuts 40. If desired one of the studs, as the stud 37, may be provided with an aperture through the outer end thereof for the reception of a keeper of a lock 41 for the purpose of preventing theft or unauthorized removal of the rim.

It will thus be seen that when the tire is in position on the carrier, it will be spaced sufficiently from the rear of the body 10 to permit not only the placement and removal of the luggage 13 but also to permit access to the rear of said body for washing or polishing the same.

It is thought from the foregoing taken in connection with the accompanying drawings that the construction and operation of my device will be apparent to those skilled in the art, and that various changes in size, shape, proportion and details of construction may be made without departing from the spirit and scope of the appended claims.

What I claim is:—

1. In a device of the class described, a motor vehicle provided with a rearwardly extending platform, a tire carrier comprising a semi-circular band provided with a flange and having its ends extending upwardly, a brace connecting the ends of said band, a plurality of supports one secured to each side of said band and one secured to said flange at the lower portion thereof, means for securing the forward portions of said braces to said platform and means carried by said band for supporting a tire and rim.

2. In a device of the class described, a tire support substantially semi-circular in form and which support is provided with an outwardly extending flange, a combined brace and lamp support secured to said flange at the ends of said tire support, rim supporting studs carried by said flange, and means for securing said support to a motor vehicle.

3. In a device of the class described, a tire carrier comprising a band provided with an outwardly projecting flange, a brace member secured at each end to said flange, a plurality of supports for said carrier, one of said supports being secured to said flange, a tire supporting stud secured to each end of said brace and to said flange and a tire supporting stud secured to said last mentioned support and to said flange.

4. In a device of the class described, a tire carrier comprising a semi-circular band provided with an outwardly projecting flange and having its ends extending upwardly, a brace secured to said flange and connecting the ends of said band, rim supporting studs secured to said brace and flange, a support secured to the bottom portion of said flange, a rim supporting stud secured to said flange and said support, and a plurality of supports secured to said band.

In testimony whereof I affix my signature.

ALBERT G. GEISTERT.